US012621787B2

(12) United States Patent
Minokuchi et al.

(10) Patent No.: US 12,621,787 B2
(45) Date of Patent: May 5, 2026

(54) NETWORK NODE AND COMMUNICATION METHOD FOR RECOVERY OF USER DATA REPOSITORY (UDR)

(71) Applicant: NTT DOCOMO, INC., Tokyo (JP)

(72) Inventors: Atsushi Minokuchi, Tokyo (JP); Shin Nishida, Tokyo (JP); Yuko Ukawa, Tokyo (JP); Hiroshi Ishikawa, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 339 days.

(21) Appl. No.: 18/269,677

(22) PCT Filed: Feb. 15, 2021

(86) PCT No.: PCT/JP2021/005504
§ 371 (c)(1),
(2) Date: Jun. 26, 2023

(87) PCT Pub. No.: WO2022/172443
PCT Pub. Date: Aug. 18, 2022

(65) Prior Publication Data
US 2024/0057010 A1 Feb. 15, 2024

(51) Int. Cl.
*H04W 60/04* (2009.01)
(52) U.S. Cl.
CPC .................................. *H04W 60/04* (2013.01)
(58) Field of Classification Search
CPC .......... H04W 60/04; H04W 8/04; H04W 8/30
See application file for complete search history.

(56) References Cited

U.S. PATENT DOCUMENTS

| | | | |
|---|---|---|---|
| 2014/0258551 A1* | 9/2014 | Ye ........................... | H04L 67/14 |
| | | | 709/228 |
| 2019/0007500 A1* | 1/2019 | Kim ...................... | H04L 67/141 |
| 2019/0116486 A1* | 4/2019 | Kim ........................ | H04W 8/10 |
| 2019/0254094 A1* | 8/2019 | Babu ..................... | H04W 76/15 |
| 2020/0045753 A1* | 2/2020 | Dao ........................ | H04W 4/08 |
| 2020/0053828 A1* | 2/2020 | Bharatia ............... | H04W 76/11 |

(Continued)

FOREIGN PATENT DOCUMENTS

JP 2013-168749 A 8/2013

OTHER PUBLICATIONS

International Search Report issued in PCT/JP2021/005504 on Sep. 21, 2021 (5 pages).

(Continued)

*Primary Examiner* — Ayaz R Sheikh
*Assistant Examiner* — Tarell A Hampton
(74) *Attorney, Agent, or Firm* — Osha Bergman Watanabe & Burton LLP

(57) ABSTRACT
A network node includes: a transmission unit configured to register a terminal to a UDR (User Data Repository); a reception unit configured to receive, from the UDR, information for identifying the UDR as a response to registration of the terminal; and a control unit configured to associate the terminal and the information for identifying the UDR with a first time at which the terminal is registered to the UDR to be stored. In a case where an error indication of the UDR is received by the reception unit, the control unit determines whether or not a re-registration of the terminal is needed, based on a time included in the error indication and the first time.

2 Claims, 11 Drawing Sheets

(56)  References Cited

U.S. PATENT DOCUMENTS

| 2021/0204103 | A1* | 7/2021 | Bartolomé Rodrigo | ................... H04W 4/50 |
| 2022/0248211 | A1* | 8/2022 | Garcia | .................. H04W 48/16 |
| 2022/0345887 | A1* | 10/2022 | Karampatsis | ......... H04L 67/306 |

OTHER PUBLICATIONS

Written Opinion of the International Searching Authority issued in PCT/JP2021/005504 on Sep. 21, 2021 (3 pages).
3GPP TR 29.821 V0.1.0; "3rd Generation Partnership Project; Technical Specification Group Core Network and Terminals; Study on Restoration of Profiles related to UDR (Release 17)"; Feb. 2021 (39 pages).
3GPP TS 23.501 V15.9.0; "3rd Generation Partnership Project; Technical Specification Group Services and System Aspects; System architecture for the 5G System (5GS) Stage 2 (Release 15)"; Mar. 2020 (248 pages).
Office Action issued in Japanese Application No. 2022-581147, dated Sep. 24, 2024 (6 pages).
3GPP TSG-CT WG4 Meeting #101-bis-e; C4-210185 "Pseudo-CR on Solution for KI 1—Propagate the change of the UDR NF status via NRF and UDM" Huawei; E-Meeting, Jan. 25-29, 2021 (13 pages).
Office Action issued in Japanese Patent Application No. 2022-581147; Dated Mar. 11, 2025 (7 pages).

* cited by examiner

Figure 3:
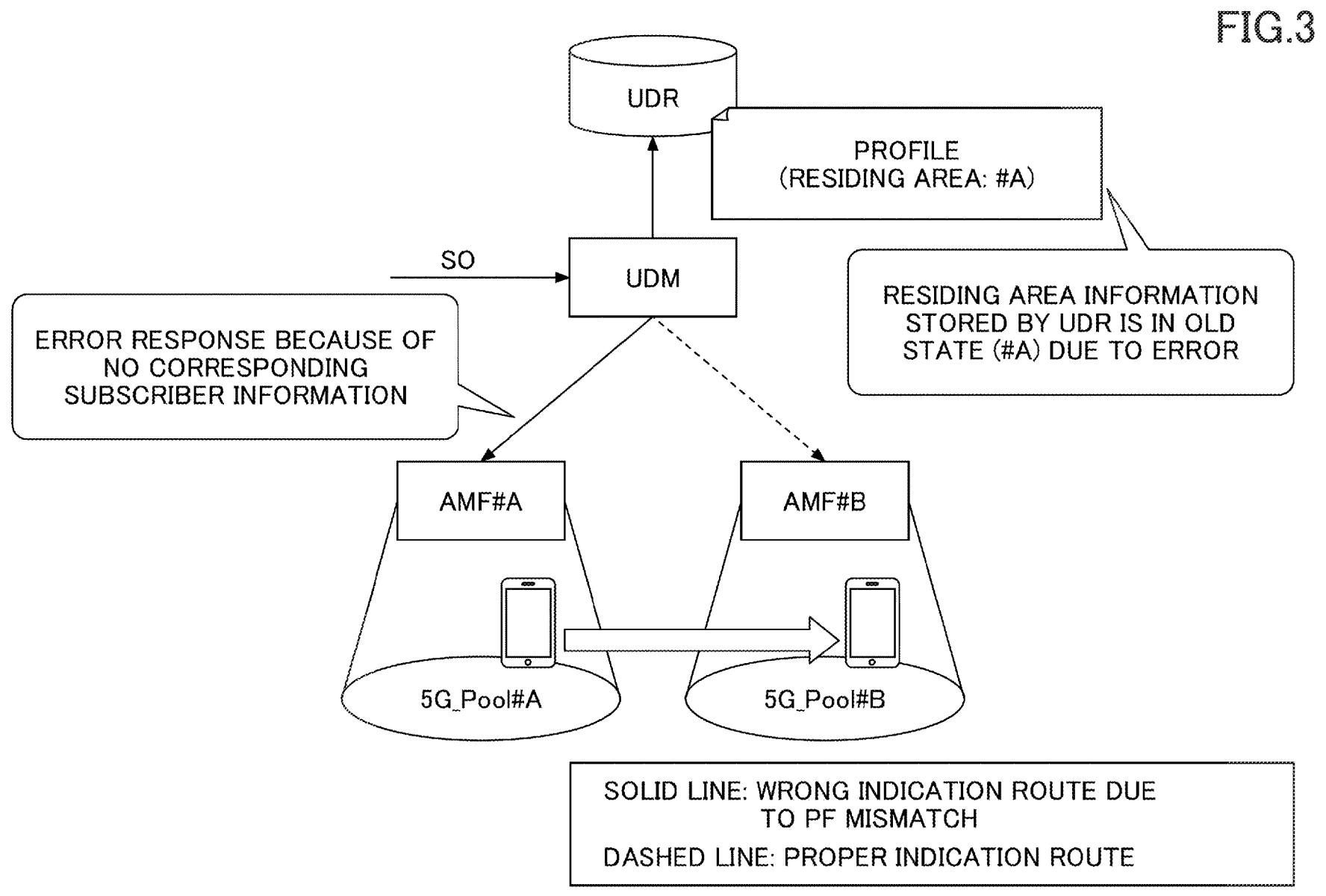

PROFILE
(RESIDING AREA: #A)

RESIDING AREA INFORMATION
STORED BY UDR IS IN OLD
STATE (#A) DUE TO ERROR

UDR

UDM

SO

ERROR RESPONSE BECAUSE OF
NO CORRESPONDING
SUBSCRIBER INFORMATION

AMF#B

AMF#A

5G_Pool#B

5G_Pool#A

SOLID LINE: WRONG INDICATION ROUTE DUE
TO PF MISMATCH

DASHED LINE: PROPER INDICATION ROUTE

NETWORK NODE AND COMMUNICATION METHOD FOR RECOVERY OF USER DATA REPOSITORY (UDR)

FIELD OF THE INVENTION

The present invention relates to a network node and a communication method in a communication system.

BACKGROUND OF THE INVENTION

In 3GPP (3rd Generation Partnership Project), in order to achieve further larger system capacity, further faster data transmission speed, further lower latency in a wireless communication section, etc., a wireless communication method called 5G or NR (New Radio) has been discussed (hereinafter, the wireless communication method is referred to as "5G" or "NR"). In 5G, various wireless technologies have been discussed in order to meet requirements including latency equal to or less than 1 ms in a wireless section while realizing a throughput equal to or greater than 10 Gbps.

In NR, an architecture has been discussed which includes: 5GC (5G Core Network) corresponding to EPC (Evolved Packet Core) that is a core network in an LTE (Long Term Evolution) network architecture; and NG-RAN (Next Generation Radio Access Network) corresponding to E-UTRAN (Evolved Universal Terrestrial Radio Access Network) that is a RAN (Radio Access Network) in the LTE network architecture (e.g., non-patent document 1).

CITATION LIST

Non-Patent Document

[Non-Patent Document 1] 3GPP TS 23.501 V15.9.0 (2020-03)

SUMMARY OF THE INVENTION

Technical Problem

In the 5G core network, in a case where the subscriber profile information is mismatched, the function for correcting the mismatched profile information has not been standardized. As a result, in a case where the subscriber profile information is mismatched, there is a case in which services based on the latest contract information or location information cannot be provided.

The present invention has been made in view of the foregoing and is intended to cause the subscriber profile information to be matched in the network.

Solution to Problem

According to the disclosed technique, a network node is provided. The network node includes: a transmission unit configured to register a terminal to a UDR (User Data Repository); a reception unit configured to receive, from the UDR, information for identifying the UDR as a response to registration of the terminal; and a control unit configured to associate the terminal and the information for identifying the UDR with a first time at which the terminal is registered to the UDR to be stored. In a case where an error indication of the UDR is received by the reception unit, the control unit determines whether or not a re-registration operation of the terminal is needed, based on a time included in the error indication and the first time.

Advantageous Effects of Invention

According to the disclosed technique, it is possible to cause the subscriber profile information to be matched in the network.

BRIEF DESCRIPTION OF THE DRAWINGS

FIG. 1 is a drawing illustrating an example of a communication system.

FIG. 3 is a drawing illustrating an example (1) of a mismatch of profile information.

DETAILED DESCRIPTION OF THE PREFERRED EMBODIMENTS

Figure 2:
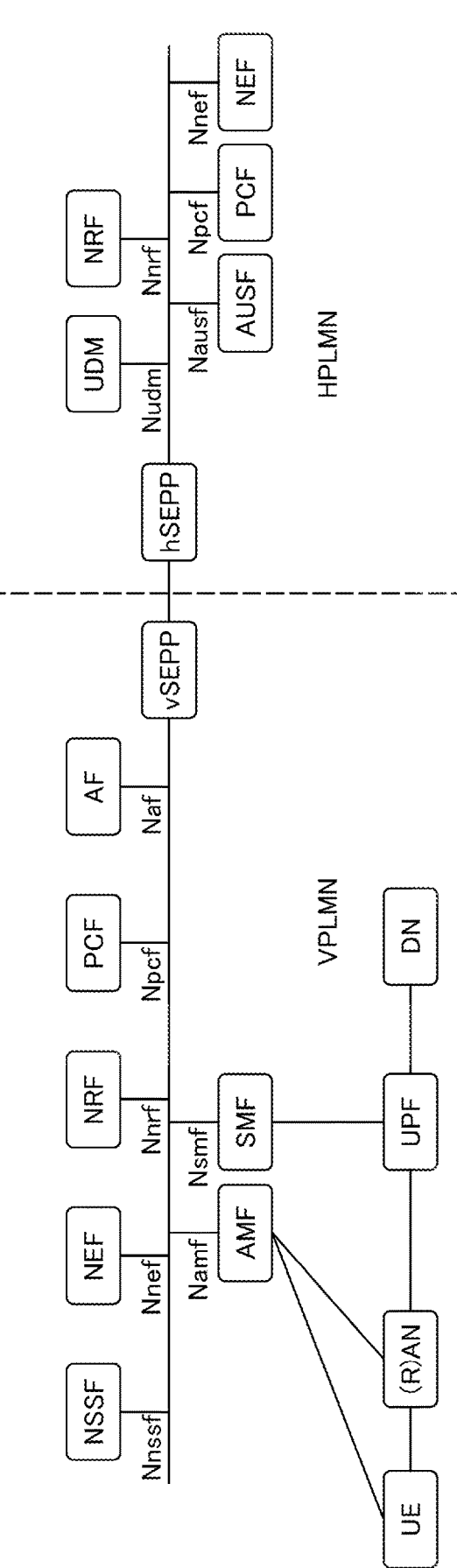
FIG. 2 is a drawing illustrating an example of a communication system under a roaming environment.

In the following, referring to the drawings, one or more embodiments of the present invention will be described. It should be noted that the embodiments described below are examples. Embodiments of the present invention are not limited to the following embodiments.

In operations of a wireless communication system according to an embodiment of the present invention, conventional techniques will be used appropriately. With respect to the above, for example, the conventional techniques are related to, but not limited to, the existing LTE. Further, it is assumed that the term "LTE" used in the present specification has, unless otherwise specifically mentioned, a broad meaning including a scheme of LTE-Advanced and a scheme after LTE-Advanced (e.g., NR), or wireless LAN (Local Area Network).

Further, in an embodiment of the present invention, the expression, radio parameters are "configured" may mean that a predetermined value is pre-configured, or may mean that a radio parameter indicated by a network node 30 or a terminal 20 is configured.

Figure 1:
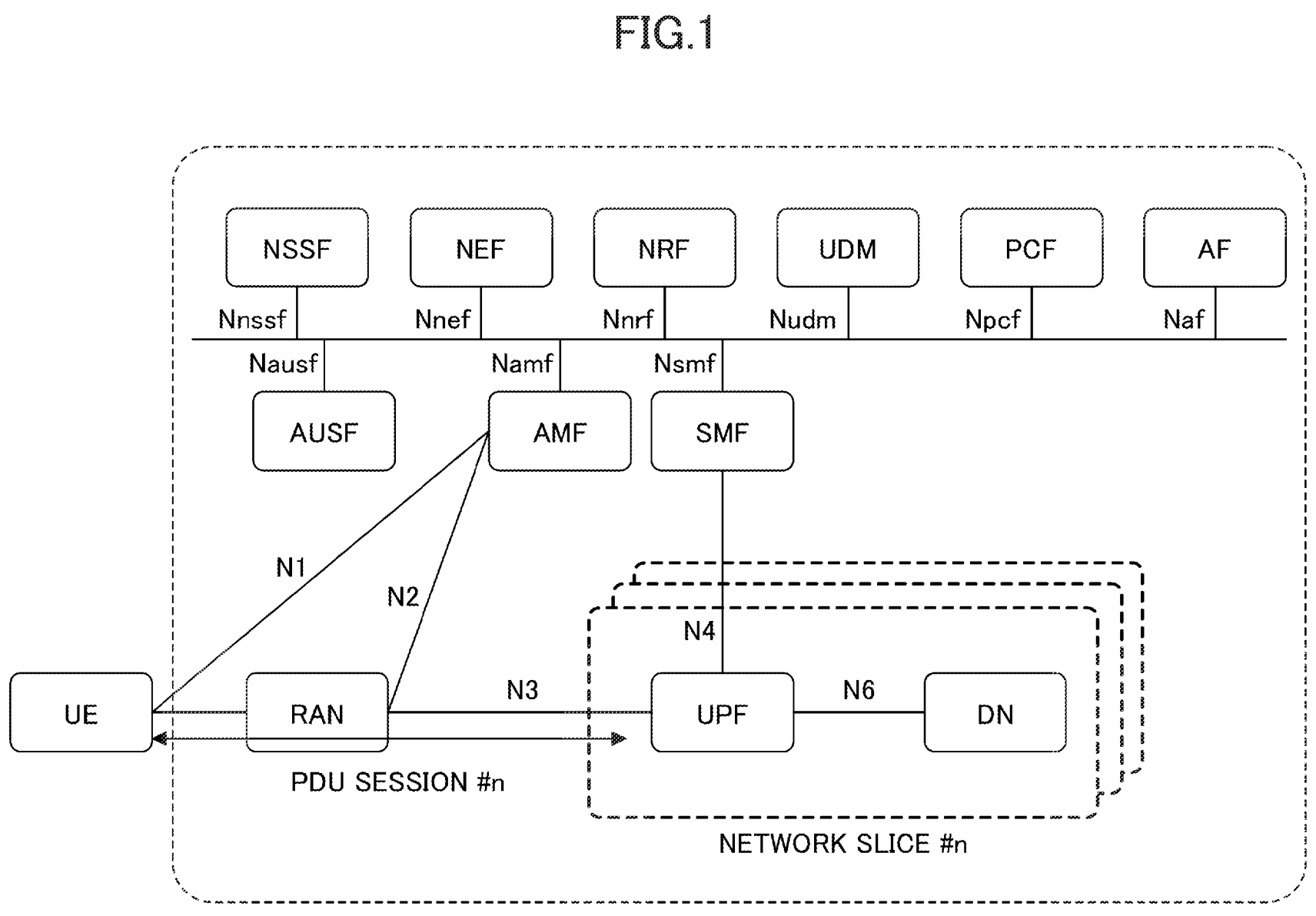

FIG. 1 is a drawing illustrating an example of a communication system. As illustrated in FIG. 1, the communication system includes a UE that is a terminal 20, and a plurality of network nodes 30. Hereafter, one network node 30 corresponds to each function, but multiple functions may be implemented by one network node 30 or one function may be implemented by multiple network nodes 30. The "connections" described below may be either a logical connection or a physical connection.

RAN (Radio Access Network) is a network node 30 with wireless access functions, may include a base station 10, and is connected to UE, AMF (Access and Mobility Management Function) and UPF (User plane function). The AMF is a network node 30 having functions of, for example, terminating the RAN interface, terminating the NAS (Non-Access Stratum), managing registration, managing connection, managing reachability, and managing mobility. The UPF is a network node 30 interconnected with DN (Data Network), and has functions such as a PDU (Protocol Data Unit) session point to an external unit, routing and forwarding packets, and QoS (Quality of Service) handling of the user plane. UPF and DN are included in a network slice. In a wireless communication network in an embodiment of the present invention, multiple network slices are included.

AMF is connected to UE, RAN, SMF (Session Management Function), NSSF (Network Slice Selection Function), NEF (Network Exposure Function), NRF (Network Repository Function), UDM (Unified Data Management), AUSF (Authentication Server Function), PCF (Policy Control Function), and AF (Application Function). AMF, SMF, NSSF, NEF, NRF, UDM, AUSF, PCF, and AF are network nodes 30 connected to each other via interfaces Namf, Nsmf, Nnssf, Nnef, Nnrf, Nudm, Nausf, Npcf, Naf based on the respective services.

The SMF is a network node 30 having functions such as session management, Internet Protocol (IP) address assignment and management of UE, DHCP (Dynamic Host Configuration Protocol) function, ARP (Address Resolution Protocol) proxy, and roaming function. The NEF is a network node 30 having a function of indicating capabilities and events to other NFs (Network Functions). The NSSF is a network node 30 having functions of, for example, selecting the network slice to which the UE is to be connected, determining the allowed NSSAI (Network Slice Selection Assistance Information), determining the configured NSSAI, and determining the AMF set to which the UE is to be connected. PCF is a network node 30 having a function of performing policy control of the network. AF is a network node 30 having a function of controlling an application server. NRF is a network node 30 having a function of discovering NF instances which provide services. UDM is a network node 30 that manages subscriber data and authentication data. UDM is connected to UDR (User Data Repository) that stores the above-described data;

FIG. 2 is a drawing illustrating an example of a communication system under a roaming environment. As illustrated in FIG. 2, the network includes a UE that is a terminal 20, and a plurality of network nodes 30. Hereafter, one network node 30 corresponds to each function, but multiple functions may be implemented by one network node 30 or one function may be implemented by multiple network nodes 30. The "connections" described below may be either a logical connection or a physical connection.

RAN is a network node 30 having a wireless access function, and is connected to UE, AMF and UPF. AMF is a network node 30 having functions of, for example, terminating the RAN interface, terminating NAS, managing registration, managing connection, managing reachability, and managing mobility. UPF is a network node 30 having functions of, for example, PDU session point to an external unit mutually connected to DN, routing and forwarding of packets, and QoS handling of the user plane. UPF and DN are included in a network slice. In a wireless communication network in an embodiment of the present invention, multiple network slices are included.

AMF is connected to UE, RAN, SMF, NSSF, NEF, NRF, UDM, AUSF, PCF, AF, and SEPP (Security Edge Protection Proxy) AMF, SMF, NSSF, NEF, NRF, UDM, AUSF, PCF, and AF are network nodes 30 connected to each other via interfaces Namf, Nsmf, Nnssf, Nnef, Nnrf, Nudm, Nausf, Npcf, Naf based on the respective services.

SMF is a network node 30 having functions such as session management, IP address assignment and management of UE, a DHCP function, an ARP proxy, and a roaming function. NEF is a network node 30 having a function of indicating capabilities and events to other NFs. NSSF is a network node 30 having functions of, for example, selecting the network slice to which the UE is to be connected, determining NSSAI to be allowed, determining NSSAI to be configured, and determining the AMF set to which the UE is to be connected. PCF is a network node 30 having a function of performing policy control of the network. AF is a network node 30 having a function of controlling an application server. NRF is a network node 30 having a function of discovering NF instances which provide services. SEPP is a non-transparent proxy and filters control plane messages between PLMNs (Public Land Mobile Networks). vSEPP shown in FIG. 2 is a SEPP in a visited network, and hSEPP is an SEPP in a home network.

As shown in FIG. 2, the UE is in a roaming environment connected to RAN and AMF in VPLMN (Visited PLMN). VPLMN and HPLMN (Home PLMN) are connected via vSEPP and hSEPP. The UE can communicate with the UDM of HPLMN via, for example. The AMF of VPLMN.

In the 5G core network, in a case where the subscriber profile information is mismatched, the function for correcting the mismatched information has not been standardized. Note that, in the 4G core network, the reset function has been standardized.

On the other hand, the UDR (User Data Repository) in the 5G core network is designed not to lose stateful data according to the DLA (Data Layered Architecture) structure, and thus, a policy of network design to guarantee data related to subscriber profile information in UDR is being discussed. However, it cannot be said that the possibility of mismatch of subscriber profile information has completely disappeared.

In a case where the subscriber profile information is mismatched, there may be a case in which services based on the latest contract information or location information cannot be provided, which will be a problem. In order to solve the problem, in a case where the subscriber profile information is mismatched between: UDR; and AMF, SMF and SMSF (Short Message Service Function), a matching process is required.

FIG. 3 is a drawing illustrating an example (1) of a mismatch of profile information. As shown in FIG. 3, when UDM receives a service order (SO), information related to the SO is transmitted to AMF. Here, because, with respect to the profile stored by UDR, the residing area is an old residing area #A due to an error, etc., the UDM indicates the information related to the SO to AMF #A. Because the actual terminal has moved from 5G_Pool #A managed by the AMF #A to 5GPool #B managed by AMF #B, there is no corresponding subscriber information in the AMF #A, resulting in an error response. The UDM is supposed to, but has failed to, indicate the information related to the SO to the AMF #B. As a result, an immediate reflection by SO is not performed, and the terminal is unable to receive services based on the latest contract. Note that the information related to the SO is also transmitted to SMF. In a case where the registration information of SMF stored by the UDR is incorrect, the immediate reflection by SO is not performed by the SMF.

Figure 4:
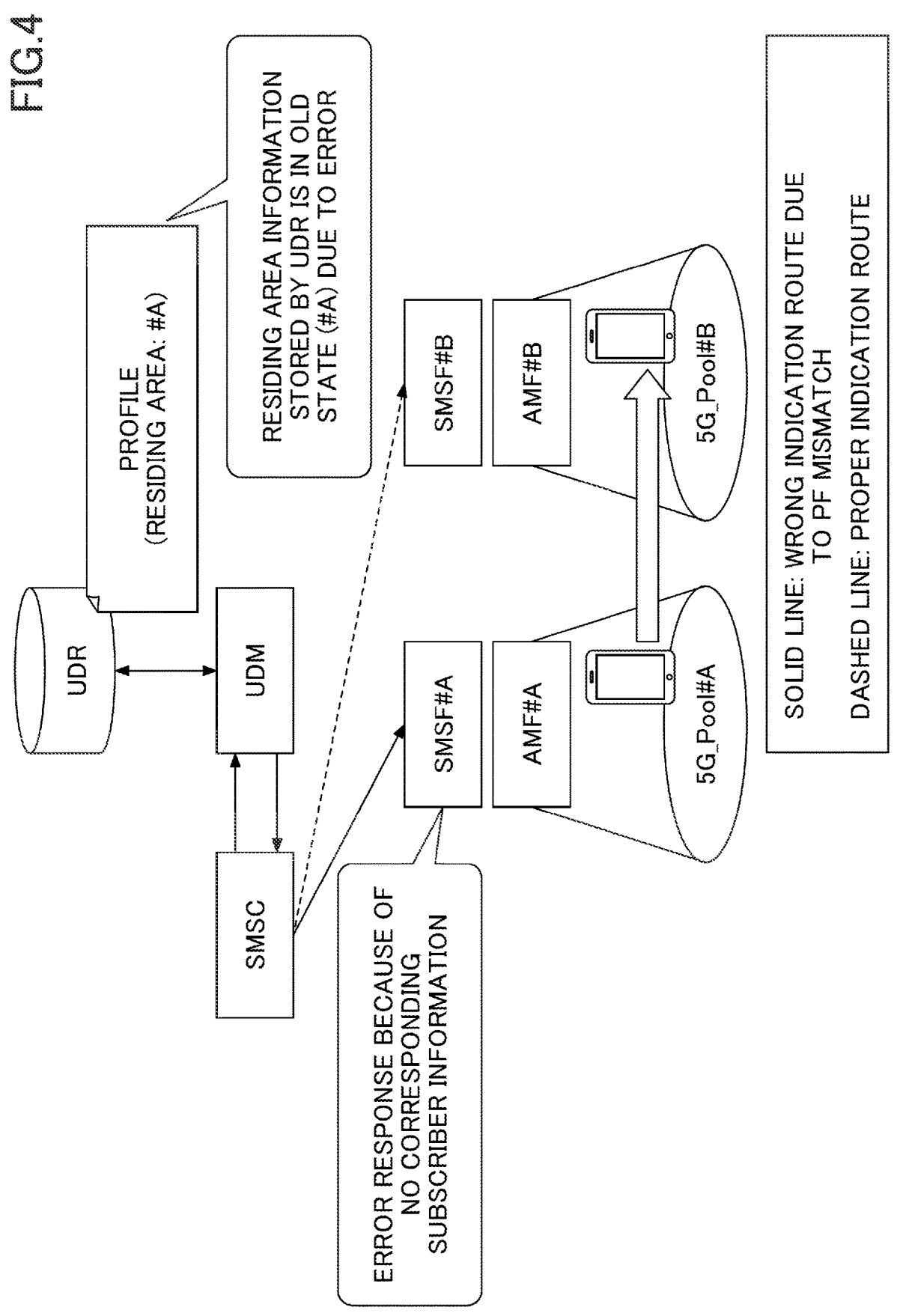
FIG. 4 is a drawing illustrating an example (2) of a mismatch of profile information.

FIG. 4 is a drawing illustrating an example (2) of a mismatch of profile information. As shown in FIG. 4, when an SMS (Short message service) arrives, SMS-GMSC (SMS Gateway Mobile Switching Center) queries the UDM for the residing area of the destination subscriber. Here, because, with respect to the profile stored by the UDR, the residing area information is an old residing area #A due to an error, etc., the UDM responds with a wrong SMSF address, and the SMS-GMSC transmits an indication to SMSF #A. Because the actual terminal has moved from 5G_Pool #A corresponding to the SMSF #A to 5GPool #B corresponding to the SMSF #B, there is no corresponding subscriber information in the SMSF #A, resulting in an error response. The UDM is supposed to, but has failed to, indicate information related to the SMS arrival to the SMSF #B. Accordingly, the SMS arrival results in an error.

Figure 5:
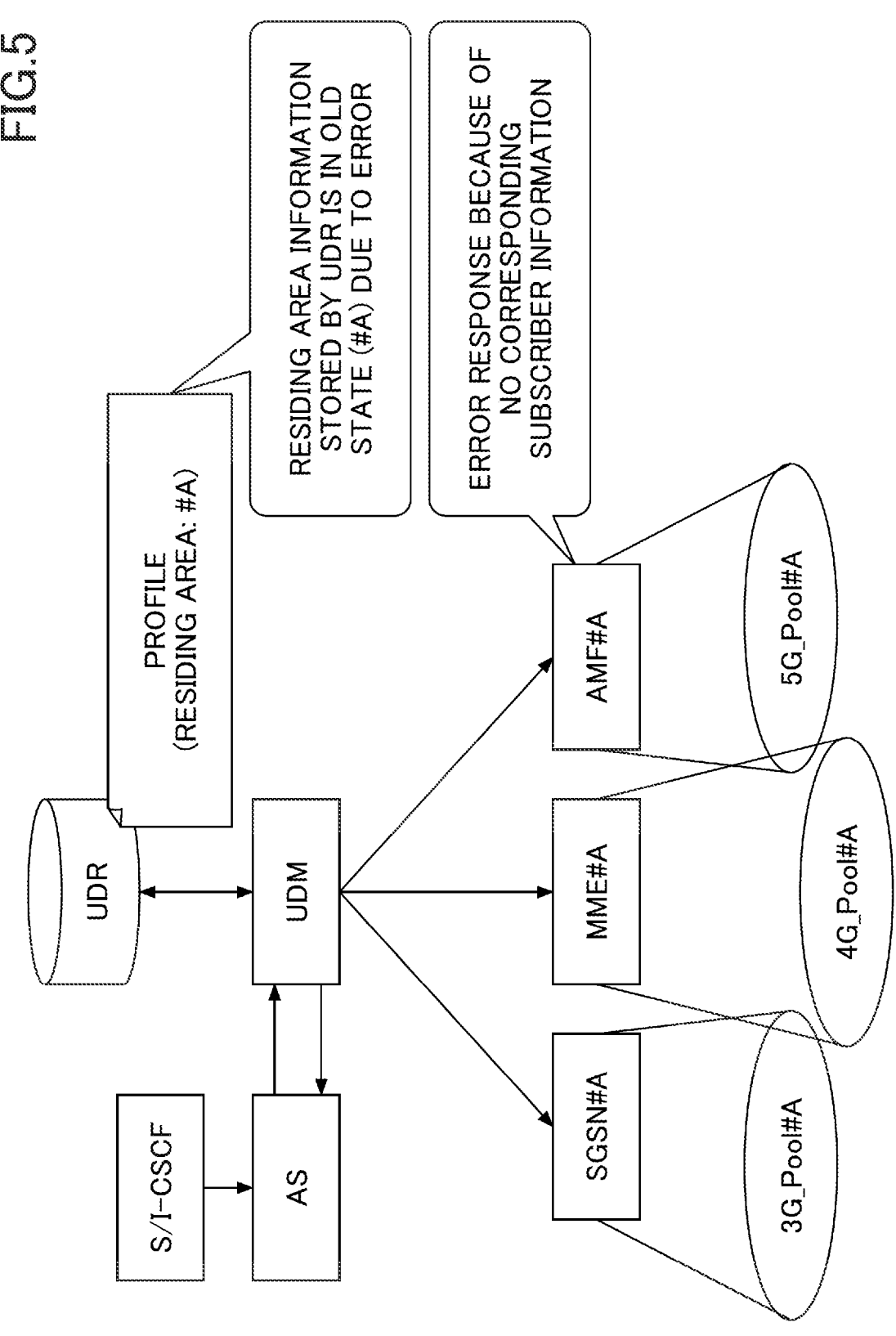
FIG. 5 is a drawing illustrating an example (3) of a mismatch of profile information.

FIG. 5 is a drawing illustrating an example (3) of a mismatch of profile information. At the time of receiving a call, T-ADS (Terminating Access Domain Selection) is performed to identify the RAT in which the called terminal resides. As shown in FIG. 5, in a case where the residing area information stored in the UDR is old, an inquiry is made to SGSN (Serving General packet radio service Support Node), MME (Mobility Management Entity) or AMF in which the called terminal does not reside, resulting in an error.

Figure 6:
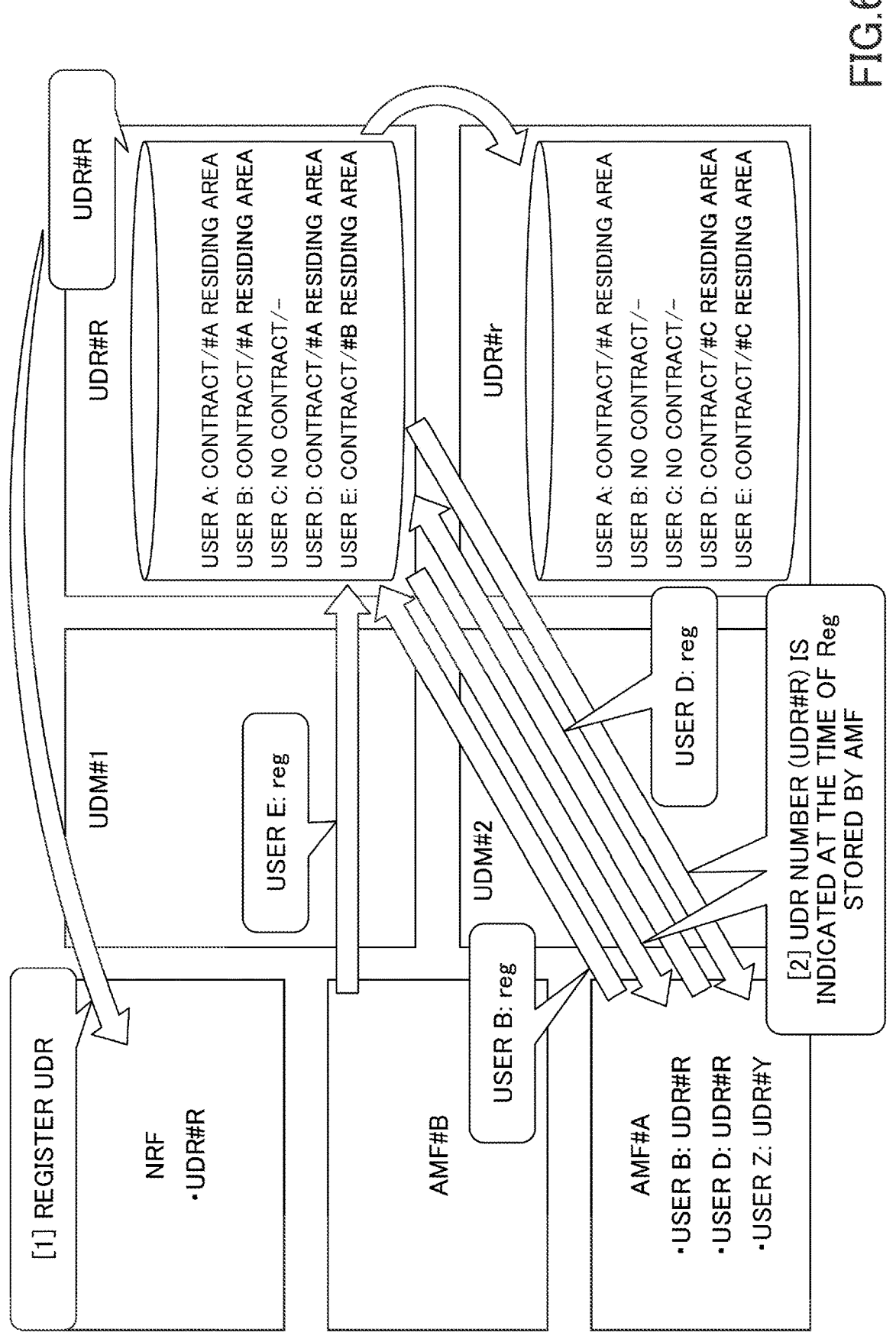
FIG. 6 is a drawing illustrating an example (1) of a communication system in an embodiment of the present invention.

Therefore, the mismatch of the subscriber profile information is resolved by the operation described below. FIG. 6 is a drawing illustrating an example (1) of a communication system in an embodiment of the present invention. As illustrated in FIG. 6, in step 1, the UDR #R registers its own NF profile including a configuration value of the UDR #R in the NRF. Subsequently, at the time of user registration, the UDR #R indicates a UDR number (UDR #R) to the AMF #A, and the AMF #A associates the user with the UDR number to be stored (step 2). For example, the user may be identified by IMSI (International Mobile Subscriber Identity), which is a type of SUPI (Subscription Permanent Identifier), to be stored.

In the example illustrated in FIG. 6, the user B is associated with UDR #R, the user D is associated with UDR #R, and the user Z is associated with UDR #Y, to be stored in the AMF #A. In addition, as the user residing area information in the UDR #R, information indicating that the user B resides in AMF #A, the user D resides in AMF #A, and the user E resides in AMF #B, is stored.

Figure 7:
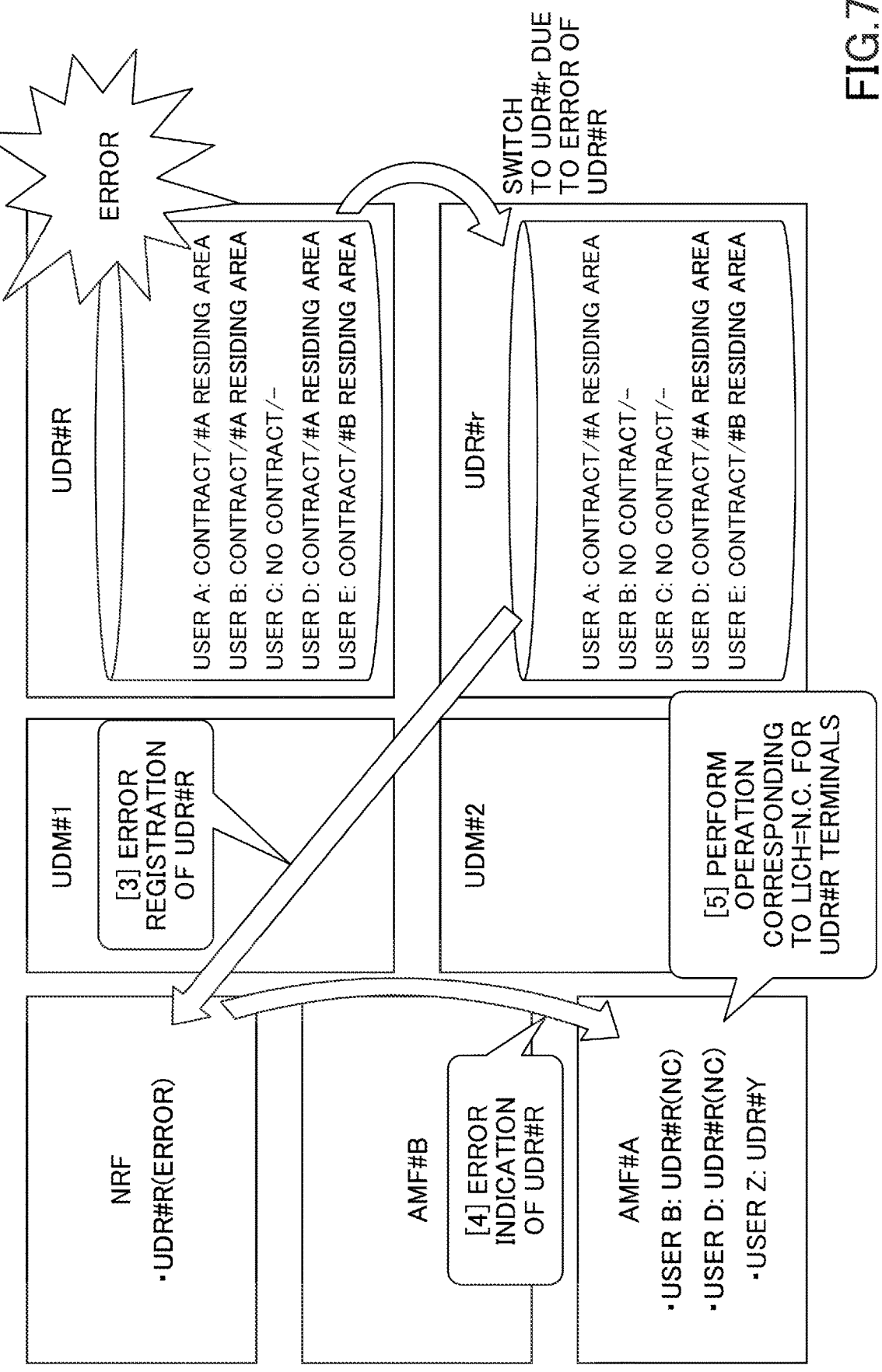
FIG. 7 is a drawing illustrating an example (2) of a communication system in an embodiment of the present invention.

FIG. 7 is a drawing illustrating an example (2) of a communication system in an embodiment of the present invention. Here, as shown in FIG. 7, an error occurs in the UDR #R. Due to an error of the UDR #R, switching to UDR #r is performed. In step 3, the UDR #r registers, in NRF, information indicating that an error has occurred in the UDR #R that is a master of the switching source. Subsequently, the NRF indicates, to the AMF #A, that an error has occurred in the UDR #R (step 4).

In subsequent step 5, the AMF #A performs an operation corresponding to LICH (Location information confirmed in HSS)=N.C. (Not Confirmed) for the user (terminal) associated with the UDR #R, and promptly recovers the location registration information stored in the UDR at an early stage. The operation corresponding to LICH=N.C. may be an operation of performing location registration to the UDM in response to the location registration trigger from the user side and an operation of suggesting location registration at the time of outgoing and incoming calls. For example, in the example illustrated in FIG. 7, because the user B and the user D are associated with the UDR #R to be stored, the AMF #A may suggest the user B and the user D to perform location registration to the UDM again.

Note that, for example, instead of step 1 shown in FIG. 6, the UDR #R may indicate, to the NRF, its own NF profile including the UDR number and the configured value of the SUPI range. Subsequently, the AMF #A may obtain the NF profile of the UDR from the NRF. Accordingly, the AMF #A can obtain the users stored in the UDR #R, and thus, it is not necessary for the UDR #R to indicate the UDR number (UDR #R) to the AMF #A in step 2 shown in FIG. 6. Note that the SUPI is an identifier for identifying a subscriber in the 5G system, IMSI is a type of SUPI and may be stored by the UDR. Note that, for example, instead of steps 3 and 4 in FIG. 7, the AMF may request the NRF in advance for an update indication of the NF profile of the UDR, and the error-occurrence and resume-completion may be indicated from the UDR to the AMF via the NRF as an update indication of the NF profile of the UDR.

In addition, for example, as a method of resolving the above-described SO reflection delay in the SMF and resolving the error operation at the time of SMS arrival shown in FIG. 4, following the step 5 shown in FIG. 7, the AMF #A may indicate, to the SMF and SMSF, a request for re-registering the terminals in the UDR.

Figure 8:
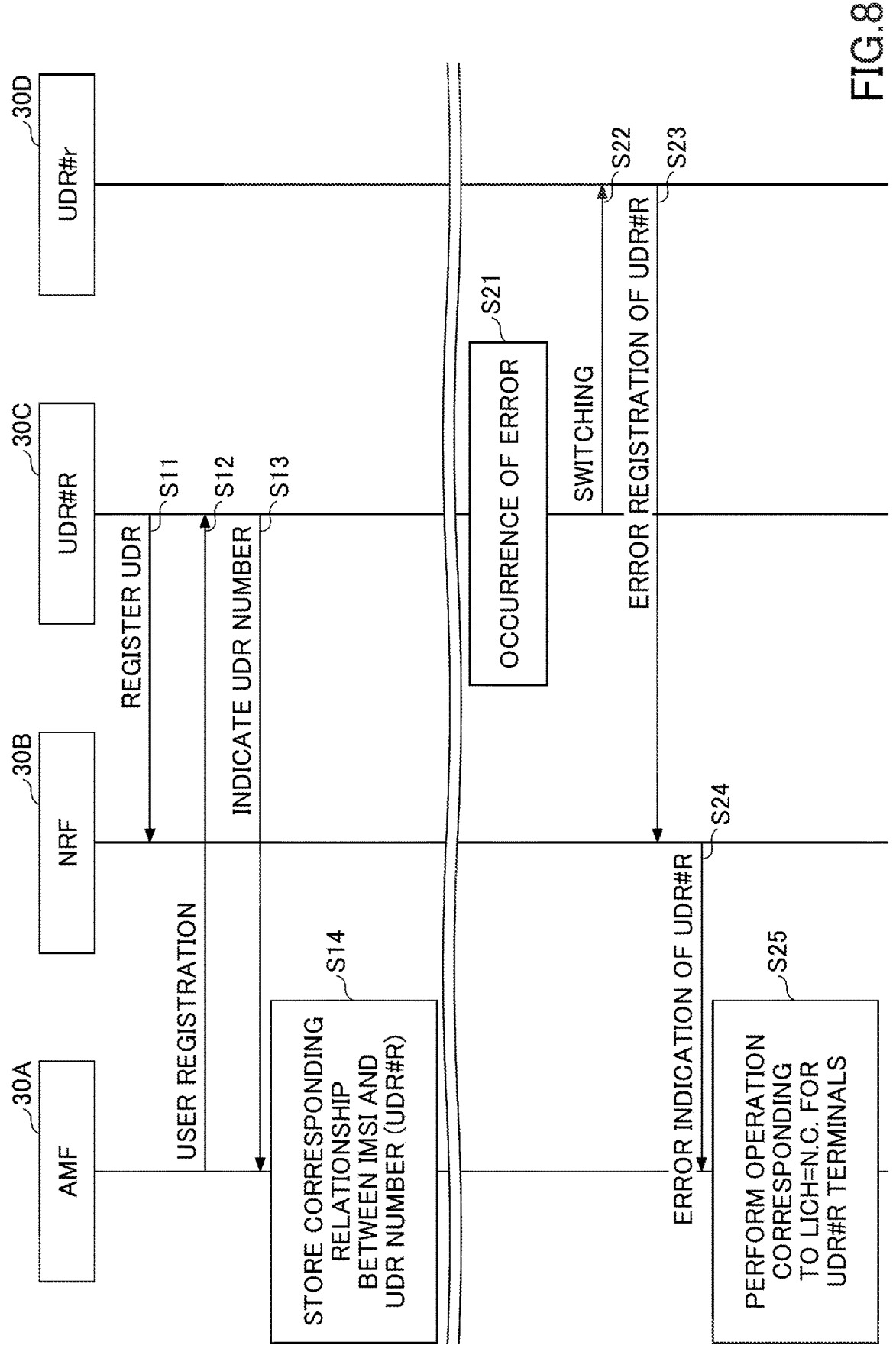
FIG. 8 is a sequence diagram illustrating an example (1) of updating profile information in an embodiment of the present invention.

FIG. 8 is a sequence diagram illustrating an example (1) of updating profile information in an embodiment of the present invention. In FIG. 8, transmission to and reception from the UDR may be performed via the UDM. In step S11, the UDR #R (30C) registers the UDR to the NRF (30B). In subsequent step S12, the AMF (30A) transmits the user registration to the UDR #R (30C). In subsequent step S13, the UDR #R indicates the UDR number (UDR #R) to the AMF. In step S14, the AMF stores the corresponding information between the IMSI and the UDR number (UDR #R). Step S14 enables the AMF to obtain the UDR in which the user is to be registered.

In step S21, an error occurs in the UDR #R. In subsequent step S22, switching from the UDR #R to the UDR #r (30D) is performed. In subsequent step S23, the UDR #r registers an error of the UDR #R to the NRF. In subsequent step S24, the NRF transmits an error indication of the UDR #R to the AMF. In subsequent step S25, the AMF performs an operation corresponding to the above-described LICH=N.C., for the terminals of the UDR #R.

Figure 9:
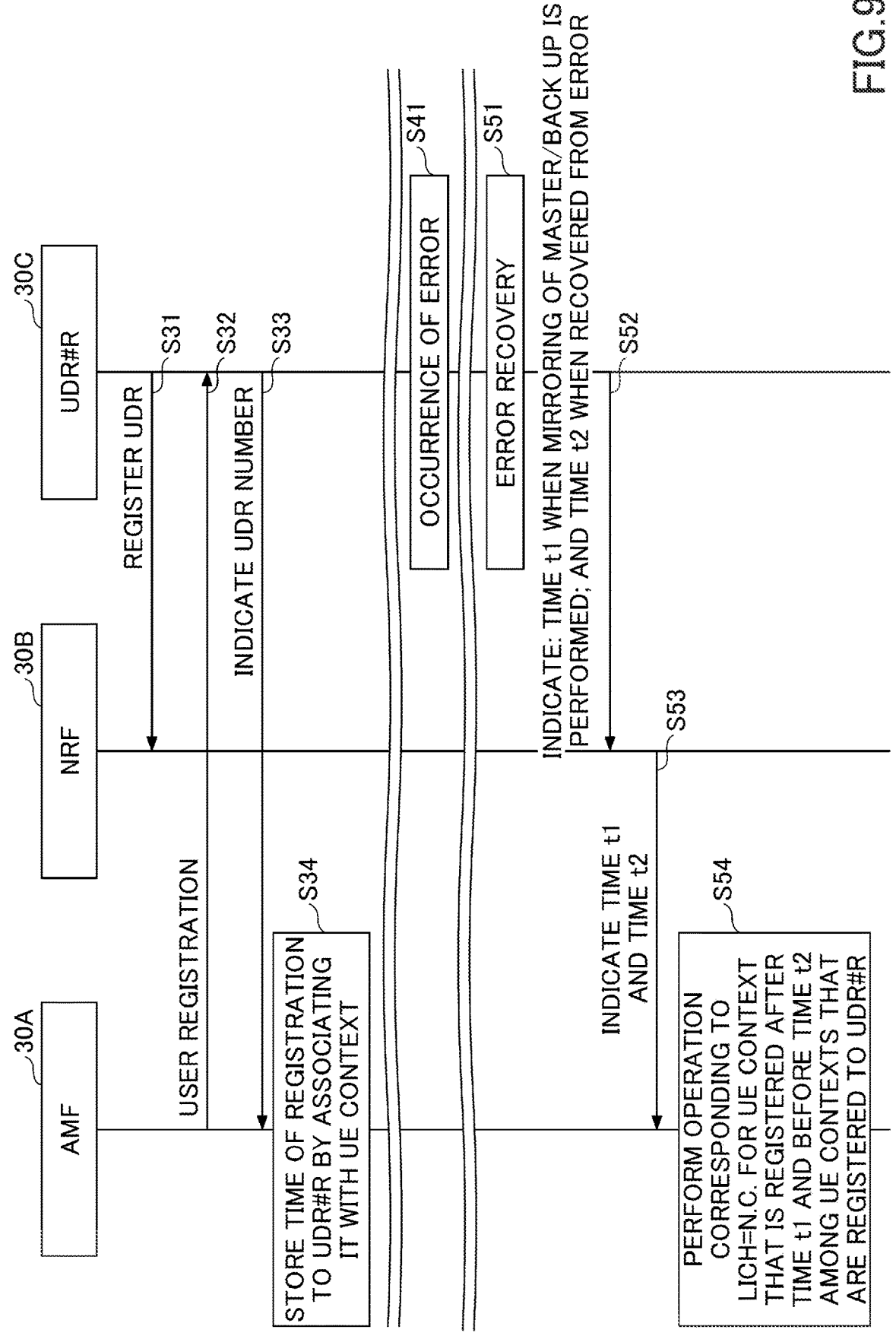
FIG. 9 is a sequence diagram illustrating an example (2) of updating profile information in an embodiment of the present invention.

FIG. 9 is a sequence diagram illustrating an example (2) of updating profile information in an embodiment of the present invention. Another example of updating profile information will be described using FIG. 9.

In step S31, the UDR #R (30C) registers the UDR to the NRF (30B). In subsequent step S32, the AMF (30A) transmits the user registration to the UDR #R (30C). In subsequent step S33, the UDR #R indicates the UDR number (UDR #R) to the AMF. Note that step S32 and step S33 may be performed via the NRF.

In step S34, the AMF stores the time at which the user is registered to the UDR #R by associating the time with the UE context corresponding to the user registration in step S32. In other words, the AMF may perform the storing by associating the UE context and the information indicating the registered UDR, that is, the UDR #R, with the time of registration to the UDR #R.

In step S41, an error occurs in the UDR #R. Note that, in the UDR #R, mirroring is assumed to be performed between the master and the backup at a predetermined timing or at a predetermined period.

In step S51, the error in the UDR #R is recovered. In step S51, the recovering to the state of the time of the latest mirroring performance according to the backup is assumed to be completed in the UDR #R.

In subsequent step S52, the UDR #R indicates, to the NRF, the time t1 at which the mirroring between the master and the backup is performed, and the time t2 at which the recovery from the error is performed, that is, at which the recovering to the state of the time of the latest mirroring performance is performed. In subsequent step S53, the NRF transmits the time t1 and the time t2 received from the UDR #R to the AMF. The indication in step S52 and step S53 may include information indicating that an error has occurred in the UDR #R at the time t1 and information indicating that the recovery from the error has been performed at the time t2.

In subsequent step S54, the AMF identifies a UE context that is registered at a time that is equal to or later than the time t1 and that is equal to or earlier than the time t2 from among the UE contexts registered to the UDR #R, based on the time that is associated with a UE context registered to the UDR #R and that is stored in step S34. Subsequently, the AMF performs the operation corresponding to the above-described LICH=N.C., with respect to the identified UE context. That is, in a case where the time, which is associated with a UE context that is registered to the UDR #R in step S34 to be stored, is equal to or later than the time t1 and is equal to or earlier than the time t2, the AMF determines that the recovery procedure is needed for the profile information in the UDR #R with respect to the UE context. The recovery procedure for the profile information in a UDR may be, for example, a re-registration operation to the UDR.

In addition, in step S54, the recovery procedure for the profile information is not performed with respect to a UE context that is registered to the UDR #R at the time equal to or earlier than the time t1 and with respect to a UE context that is registered to the UDR #R at the time equal to or later than the time t2. Accordingly, the execution of the sequence for updating profile information illustrated in FIG. 9 can reduce the network load as compared with the execution of recovery procedure for the profile information with respect to all UE contexts that are registered to the UDR #R from the AMF.

According to the above-described embodiment, the AMF can update the subscriber profile information by performing the location registration operation again even in a case where an error occurs in the UDR. In addition, the AMF can reduce the load by reducing the number of UE contexts when performing the recovery procedure for the profile information in the UDR in a case where an error occurs in the UDR.

That is, it is possible to cause the subscriber profile information to be matched in the network.

(Apparatus Configuration)

Next, a functional configuration example of the base station 10, network node 30 and the terminal 20 that perform processes and operations described above will be described. The base station 10, the network node 30 and the terminal 20 include functions for implementing the embodiments described above. It should be noted, however, that each of the base station 10, the network node 30 and the terminal 20 may include only some of the functions in the embodiments.

<Base Station 10 and Network Node 30>

Figure 10:
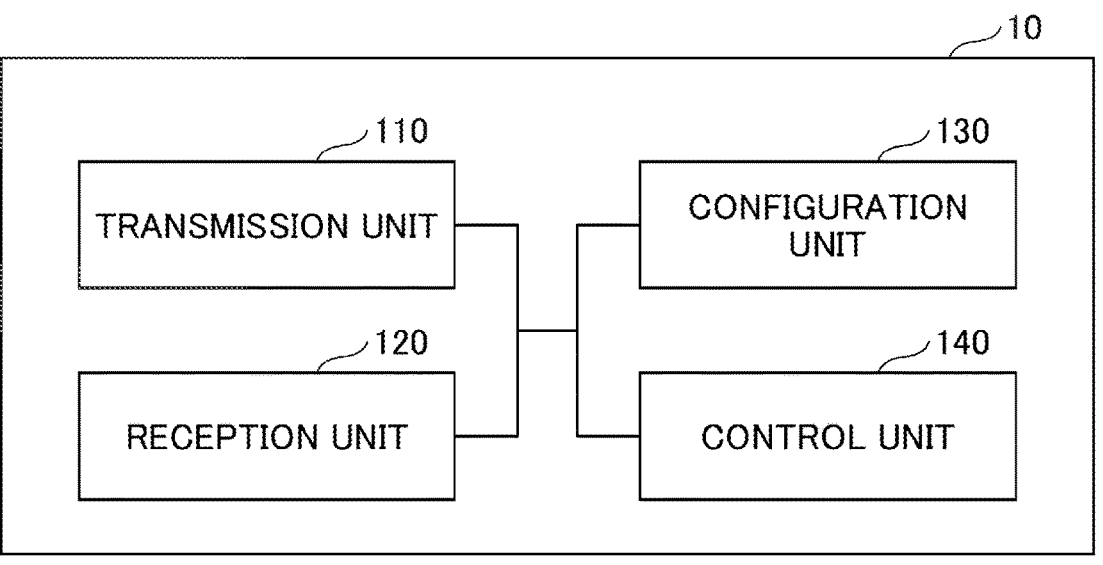
FIG. 10 is a drawing illustrating an example of a functional structure of a base station 10 in an embodiment of the present invention.

FIG. 10 is a diagram illustrating an example of a functional configuration of the base station 10. As shown in FIG. 10, the base station 10 includes a transmission unit 110, a reception unit 120, a configuration unit 130, and a control unit 140. The functional structure illustrated in FIG. 10 is merely an example. Functional divisions and names of functional units may be anything as long as operations according to an embodiment of the present invention can be performed. Note that the network node 30 may have the same functional configuration as the base station 10. In addition, the network nodes 30 having multiple different functions in the system architecture may be composed of multiple network nodes 30 separated for each function.

The transmission unit 110 includes a function for generating a signal to be transmitted to the terminal 20 or to another network node 30 and transmitting the signal in a wired manner or wireless manner. The reception unit 120 includes a function for receiving various signals transmitted from the terminal 20 or another network node 30, and for acquiring, for example, information of an upper layer from the received signals.

The configuration unit 130 stores preset configuration information and various configuration information items to be transmitted to the terminal 20 in a storage apparatus and reads the preset configuration information from the storage apparatus if necessary. The contents of the configuration information are, for example, subscriber profile information in the network.

The control unit 140 performs a process related to updating of the subscriber profile information in the network as described in the embodiments. Further, the control unit 140 performs a process related to communications with the terminal 20. The functional units related to signal transmission in the control unit 140 may be included in the transmission unit 110, and the functional units related to signal reception in the control unit 140 may be included in the reception unit 120.

<Terminal 20>

Figure 11:
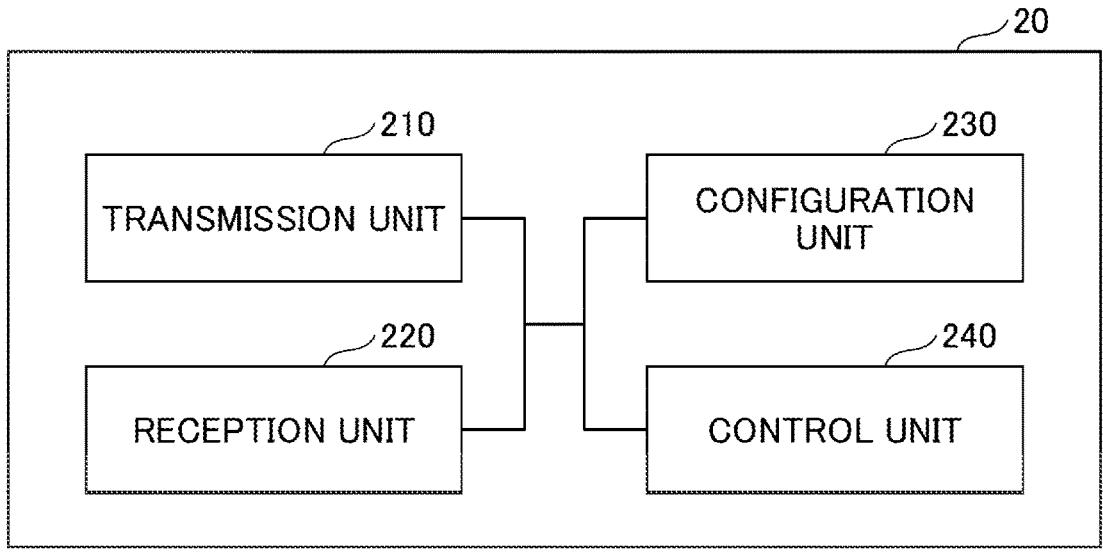
FIG. 11 is a drawing illustrating an example of a functional structure of a terminal 20 in an embodiment of the present invention.

FIG. 11 is a diagram illustrating an example of a functional configuration of the terminal 20. As shown in FIG. 11, the terminal 20 includes a transmission unit 210, a reception unit 220, a configuration unit 230, and a control unit 240. The functional structure illustrated in FIG. 11 is merely an example. Functional divisions and names of functional units may be anything as long as operations according to an embodiment of the present invention can be performed.

The transmission unit 210 generates a transmission signal from transmission data and transmits the transmission signal wirelessly. The reception unit 220 receives various signals wirelessly and obtains upper layer signals from the received physical layer signals. Further, the reception unit 220 has a function of receiving NR-PSS, NR-SSS, NR-PBCH, DL/UL control signals, or reference signals transmitted from the network node 30.

The configuration unit 230 stores various types of configuration information received from the network node 30 by the reception unit 220 in the storage device and reads the configuration information from the storage device as necessary. In addition, the configuration unit 230 stores pre-configured configuration information. The contents of the configuration information are, for example, information related to the network to which the connection is allowed.

The control unit 240 performs a process related to the connection control to the network and the network slice as described in the embodiments. The functional units related to signal transmission in the control unit 240 may be included in the transmission unit 210, and the functional units related to signal reception in the control unit 240 may be included in the reception unit 220.

(Hardware Structure)

In the above functional structure diagrams used for describing an embodiment of the present invention (FIG. 10 and FIG. 11), functional unit blocks are shown. The functional blocks (function units) are realized by a freely-selected combination of hardware and/or software. Further, realizing means of each functional block is not limited in particular. In other words, each functional block may be realized by a single apparatus in which multiple elements are coupled physically and/or logically, or may be realized by two or more apparatuses that are physically and/or logically separated and are physically and/or logically connected (e.g., wired and/or wireless). The functional blocks may be realized by combining the above-described one or more apparatuses with software.

Functions include, but are not limited to, judging, determining, calculating, processing, deriving, investigating, searching, checking, receiving, transmitting, outputting, accessing, resolving, selecting, establishing, comparing, assuming, expecting, and deeming; broadcasting, notifying, communicating, forwarding, configuring, reconfiguring, allocating, mapping, and assigning, etc. For example, a functional block (component) that functions to transmit is called a transmitting unit or a transmitter. In either case, as described above, the implementation method is not particularly limited.

Figure 12:
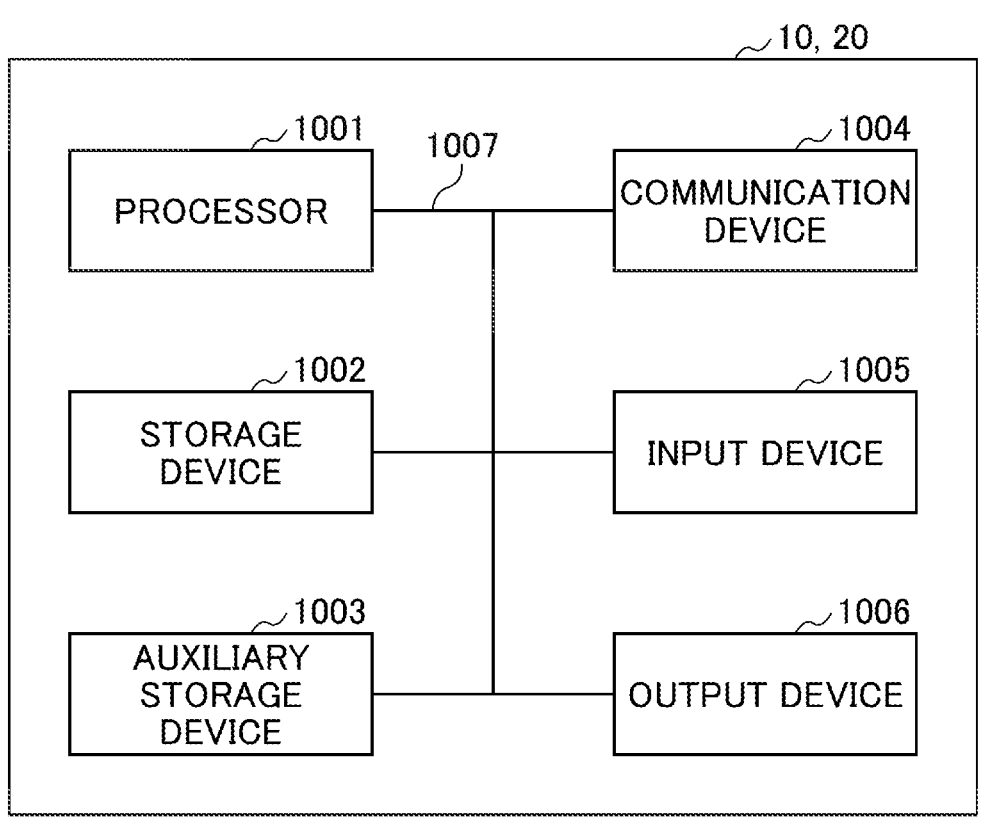
FIG. 12 is a drawing illustrating an example of a hardware structure of the base station 10 and the terminal 20 in an embodiment of the present invention.

For example, the network node 30, terminal 20, etc., according to an embodiment of the present disclosure may function as a computer for processing the radio communication method of the present disclosure. FIG. 12 is a drawing illustrating an example of hardware structures of the base station 10 and terminal 20 according to an embodiment of the present invention. The network node 30 may have the same hardware configuration as the base station 10. Each of the above-described base station 10 and the terminal 20 may be physically a computer device including a processor 1001, a storage device 1002, an auxiliary storage device 1003, a communication device 1004, an input device 1005, an output device 1006, a bus 1007, etc.

It should be noted that, in the descriptions below, the term "apparatus" can be read as a circuit, a device, a unit, etc. The hardware structures of the base station 10 and terminal 20 may include one or more of each of the devices illustrated in the figure, or may not include some devices.

Each function in the base station 10 and terminal 20 is realized by having the processor 1001 perform an operation by reading predetermined software (programs) onto hardware such as the processor 1001 and the storage device 1002, and by controlling communication by the communication device 1004 and controlling at least one of reading and writing of data in the storage device 1002 and the auxiliary storage device 1003.

The processor 1001 controls the entire computer by, for example, controlling the operating system. The processor 1001 may include a central processing unit (CPU) including an interface with a peripheral apparatus, a control apparatus, a calculation apparatus, a register, etc. For example, the above-described control unit 140, control unit 240, and the like, may be implemented by the processor 1001.

Further, the processor 1001 reads out onto the storage device 1002 a program (program code), a software module, or data from the auxiliary storage device 1003 and/or the communication device 1004, and performs various processes according to the program, the software module, or the data. As the program, a program is used that causes the computer to perform at least a part of operations according to an embodiment of the present invention described above. For example, the control unit 140 of the base station 10 illustrated in FIG. 10 may be realized by control programs that are stored in the storage device 1002 and are executed by the processor 1001. Further, for example, the control unit 240 of the terminal 20 illustrated in FIG. 11 may be realized by control programs that are stored in the storage device 1002 and are executed by the processor 1001. The various processes have been described to be performed by a single processor 1001. However, the processes may be performed by two or more processors 1001 simultaneously or sequentially. The processor 1001 may be implemented by one or more chips. It should be noted that the program may be transmitted from a network via a telecommunication line.

The storage device 1002 is a computer-readable recording medium, and may include at least one of a ROM (Read Only Memory), an EPROM (Erasable Programmable ROM), an EEPROM (Electrically Erasable Programmable ROM), a RAM (Random Access Memory), etc. The storage device 1002 may be referred to as a register, a cache, a main memory, etc. The storage device 1002 is capable of storing programs (program codes), software modules, or the like, that are executable for performing communication processes according to an embodiment of the present invention.

The auxiliary storage device 1003 is a computer-readable recording medium, and may include at least one of, for example, an optical disk such as a CD-ROM (Compact Disc ROM), a hard disk drive, a flexible disk, a magneto optical disk (e.g., compact disk, digital versatile disk, Blu-ray (registered trademark) disk), a smart card, a flash memory (e.g., card, stick, key drive), a floppy (registered trademark) disk, a magnetic strip, etc. The above recording medium may be a database including the storage device 1002 and/or the auxiliary storage device 1003, a server, or any other appropriate medium.

The communication device 1004 is hardware (transmission and reception device) for communicating with computers via at least one of a wired network and a wireless network, and may be referred to as a network device, a network controller, a network card, a communication module, etc. The communication device 1004 may comprise a high frequency switch, duplexer, filter, frequency synthesizer, or the like, for example, to implement at least one of a frequency division duplex (FDD) and a time division duplex (TDD). For example, the transmitting/receiving antenna, the amplifier unit, the transmitting/receiving unit, the transmission line interface, and the like, may be implemented by the communication device 1004. The transmitting/receiving unit may be physically or logically divided into a transmitting unit and a receiving unit.

The input device 1005 is an input device that receives an external input (e.g., keyboard, mouse, microphone, switch, button, sensor). The output device 1006 is an output device that outputs something to the outside (e.g., display, speaker, LED lamp). It should be noted that the input device 1005 and the output device 1006 may be integrated into a single device (e.g., touch panel).

Further, the apparatuses including the processor 1001, the storage device 1002, etc., are connected to each other via the bus 1007 used for communicating information. The bus 1007 may include a single bus, or may include different buses between the apparatuses.

Further, each of the base station 10 and terminal 20 may include hardware such as a microprocessor, a digital signal processor (DSP), an ASIC (Application Specific Integrated Circuit), a PLD (Programmable Logic Device), a FPGA (Field Programmable Gate Array), etc., and a part or all of each functional block may be realized by the hardware. For example, the processor 1001 may be implemented by at least one of the above hardware elements.

Embodiment Summary

As described above, according to an embodiment of the present invention, a network node is provided. The network node includes: a transmission unit configured to register a terminal to a UDR (User Data Repository); a reception unit configured to receive, from the UDR, information for identifying the UDR as a response to registration of the terminal; and a control unit configured to associate the terminal and the information for identifying the UDR with a first time at which the terminal is registered to the UDR to be stored. In a case where an error indication of the UDR is received by the reception unit, the control unit determines whether or not a re-registration operation of the terminal is needed, based on a time included in the error indication and the first time.

According to the above configuration, the AMF can reduce the load by reducing the number of UE contexts when performing the recovery procedure for the profile information in the UDR in a case where an error occurs in the UDR. That is, it is possible to cause the subscriber profile information to be matched in the network.

The reception unit may receive the error indication that includes a second time at which mirroring with a backup is performed by the UDR and a third time at which mirroring is performed by the UDR after an error occurrence based on the backup. According to the above configuration, the AMF can reduce the load by reducing the number of UE contexts when performing the recovery procedure for the profile information in the UDR in a case where an error occurs in the UDR.

The control unit may determine that the re-registration operation of the terminal is needed in a case where the first time is equal to or later than the second time and is equal to or earlier than the third time. According to the above configuration, the AMF can reduce the load by reducing the number of UE contexts when performing the recovery procedure for profile information in the UDR in a case where an error occurs in the UDR.

In addition, according to an embodiment of the present invention, a communication method of a network node is provided. The communication method includes: registering a terminal to a UDR (User Data Repository); receiving, from the UDR, information for identifying the UDR as a response to registration of the terminal; associating the terminal and the information for identifying the UDR with a first time at which the terminal is registered to the UDR to be stored; and, in a case where an error indication of the UDR is received, determining whether or not a re-registration of the terminal is needed, based on a time included in the error indication and the first time.

According to the above configuration, the AMF can reduce the load by reducing the number of UE contexts when performing the recovery procedure for profile information in the UDR in a case where an error occurs in the UDR. That is, it is possible to cause the subscriber profile information to be matched in the network.

(Supplement of Embodiment)

As described above, one or more embodiments have been described. The present invention is not limited to the above embodiments. A person skilled in the art should understand that there are various modifications, variations, alternatives, replacements, etc., of the embodiments. In order to facilitate understanding of the present invention, specific values have been used in the description. However, unless otherwise specified, those values are merely examples and other appropriate values may be used. The division of the described items may not be essential to the present invention. The things that have been described in two or more items may be used in a combination if necessary, and the thing that has been described in one item may be appropriately applied to another item (as long as there is no contradiction) Boundaries of functional units or processing units in the functional block diagrams do not necessarily correspond to the boundaries of physical parts. Operations of multiple functional units may be physically performed by a single part, or an operation of a single functional unit may be physically performed by multiple parts. The order of sequences and flowcharts described in an embodiment of the present invention may be changed as long as there is no contradiction. For the sake of description convenience, each of the network node 30 and the terminal 20 has been described by using functional block diagrams. However, the apparatuses may be implemented by hardware, software, or a combination of hardware and software. The software executed by a processor included in the network node 30 according to an embodiment of the present invention and the software executed by a processor included in the terminal 20 according to an embodiment of the present invention may be stored in a random access memory (RAM), a flash memory, a read only memory (ROM), an EPROM, an EEPROM, a register, a hard disk (HDD), a removable disk, a CD-ROM, a database, a server, or any other appropriate recording medium.

Further, information indication may be performed not only by methods described in an aspect/embodiment of the present specification but also a method other than those described in an aspect/embodiment of the present specification. For example, the information transmission may be performed by physical layer signaling (e.g., DCI (Downlink Control Information), UCI (Uplink Control Information)), upper layer signaling (e.g., RRC (Radio Resource Control) signaling, MAC (Medium Access Control) signaling, broadcast information (MIB (Master Information Block), SIB (System Information Block))), other signals, or combinations thereof. Further, RRC signaling may be referred to as an RRC message. The RRC signaling may be, for example, an RRC connection setup message, an RRC connection reconfiguration message, or the like.

Each aspect/embodiment described in the present disclosure may be applied to at least one of a system using LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (new Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), and other appropriate systems, and a next generation system enhanced therefrom. Further, multiple systems may also be applied in combination (e.g., at least one of LTE and LTE-A combined with 5G, etc.).

The order of processing steps, sequences, flowcharts or the like of an aspect/embodiment described in the present specification may be changed as long as there is no contra-diction. For example, in a method described in the present specification, elements of various steps are presented in an exemplary order. The order is not limited to the presented specific order.

The particular operations, that are supposed to be per-formed by the network node 30 in the present specification, may be performed by an upper node in some cases. In a network including one or more network nodes including the network node 30, it is apparent that various operations performed for communicating with the terminal 20 may be performed by at least one of the network node 30 and another network node other than the network node 30 (for example, but not limited to, MME or S-GW). According to the above, a case is described in which there is another single network node other than the network node 30. However, the other network node may be a combination of multiple other network nodes (e.g., MME and S-GW).

The information or signals described in this disclosure may be output from a higher layer (or lower layer) to a lower layer (or higher layer). The information or signals may be input or output through multiple network nodes.

The input or output information may be stored in a specific location (e.g., memory) or managed using manage-ment tables. The input or output information may be over-written, updated, or added. The information that has been output may be deleted. The information that has been input may be transmitted to another apparatus.

A decision or a determination in an embodiment of the present invention may be realized by a value (0 or 1) represented by one bit, by a boolean value (true or false), or by comparison of numerical values (e.g., comparison with a predetermined value).

Software should be broadly interpreted to mean, whether referred to as software, firmware, middle-ware, microcode, hardware description language, or any other name, instruc-tions, instruction sets, codes, code segments, program codes, programs, subprograms, software modules, applications, software applications, software packages, routines, subrou-tines, objects, executable files, executable threads, proce-dures, functions, and the like.

Further, software, instructions, information, and the like may be transmitted and received via a transmission medium. For example, in the case where software is transmitted from a website, server, or other remote source using at least one of wired line technologies (such as coaxial cable, fiber optic cable, twisted pair, digital subscriber line (DSL) and wire-less technologies (infrared, microwave, etc.), at least one of these wired line technologies and wireless technologies is included within the definition of the transmission medium.

Information, a signal, or the like, described in the present specification may be represented by using any one of various different technologies. For example, data, an instruction, a command, information, a signal, a bit, a symbol, a chip, or the like, described throughout the present application, may be represented by a voltage, an electric current, electromag-netic waves, magnetic fields, a magnetic particle, optical fields, a photon, or a combination thereof.

It should be noted that a term used in the present speci-fication and/or a term required for understanding of the present specification may be replaced by a term having the same or similar meaning. For example, a channel and/or a symbol may be a signal (signaling). Further, a signal may be a message. Further, the component carrier (CC) may be referred to as a carrier frequency, cell, frequency carrier, or the like.

As used in the present disclosure, the terms "system" and "network" are used interchangeably.

Further, the information, parameters, and the like, described in the present disclosure may be expressed using absolute values, relative values from predetermined values, or they may be expressed using corresponding different information. For example, a radio resource may be what is indicated by an index.

The names used for the parameters described above are not used as limitations. Further, the mathematical equations using these parameters may differ from those explicitly disclosed in the present disclosure. Because the various channels (e.g., PUCCH, PDCCH) and information elements may be identified by any suitable names, the various names assigned to these various channels and information elements are not used as limitations.

In the present disclosure, the terms "BS: Base Station", "Radio Base Station", "Base Station Apparatus", "Fixed Station", "NodeB", "eNodeB (eNB)", "gNodeB (gNB)", "Access Point", "Transmission Point", "Reception Point", "Transmission/Reception Point", "Cell", "Sector", "Cell Group", "Carrier", "Component Carrier", and the like, may be used interchangeably. The base station may be referred to as a macro-cell, a small cell, a femtocell, a picocell and the like.

The base station may accommodate (provide) one or more (e.g., three) cells. In the case where the base station accom-modates a plurality of cells, the entire coverage area of the base station may be divided into a plurality of smaller areas, each smaller area may provide communication services by means of a base station subsystem (e.g., an indoor small base station or a remote Radio Head (RRH)). The term "cell" or "sector" refers to a part or all of the coverage area of at least one of the base station and base station subsystem that provides communication services at the coverage.

In the present disclosure, terms such as "mobile station (MS)", "user terminal", "user equipment (UE)", "terminal", and the like, may be used interchangeably.

There is a case in which the mobile station may be referred to, by a person skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms.

At least one of the base station and the mobile station may be referred to as a transmission apparatus, reception appa-ratus, communication apparatus, or the like. The at least one of the base station and the mobile station may be a device mounted on the mobile station, the mobile station itself, or the like. The mobile station may be a vehicle (e.g., a car, an airplane, etc.), an unmanned mobile body (e.g., a drone, an automated vehicle, etc.), or a robot (manned or unmanned). At least one of the base station and the mobile station may include an apparatus that does not necessarily move during communication operations. For example, at least one of the base station and the mobile station may be an IoT (Internet of Things) device such as a sensor.

Further, the base station in the present disclosure may be read as the user terminal. For example, each aspect/embodi-ment of the present disclosure may be applied to a configu-ration in which communications between the base station and the user terminal are replaced by communications between multiple terminals 20 (e.g., may be referred to as D2D (Device-to-Device), V2X (Vehicle-to-Everything), etc.). In this case, a function of the network node 30 described above may be provided by the terminal 20. Further, the phrases "up" and "down" may also be replaced by the phrases corresponding to terminal-to-terminal communication (e.g., "side"). For example, an uplink channel, a downlink channel, or the like, may be read as a sidelink channel.

Further, the user terminal in the present disclosure may be read as the base station. In this case, the function of the user terminal described above may be provided by the base station.

The term "determining" used in the present specification may include various actions or operations. The "determining" may include, for example, a case in which "judging", "calculating", "computing", "processing", "deriving", "investigating", "looking up, search, inquiry" (e.g., looking up a table, database, or other data structures), or "ascertaining" is deemed as "determining". Further, the "determining" may include a case in which "receiving" (e.g., receiving information), "transmitting" (e.g., transmitting information), "inputting", "outputting", or "accessing" (e.g., accessing data in a memory) is deemed as "determining". Further, the "determining" may include a case in which "resolving", "selecting", "choosing", "establishing", "comparing", or the like is deemed as "determining". In other words, the "determining" may include a case in which a certain action or operation is deemed as "determining". Further, "decision" may be read as "assuming", "expecting", or "considering", etc.

The term "connected" or "coupled" or any variation thereof means any direct or indirect connection or connection between two or more elements and may include the presence of one or more intermediate elements between the two elements "connected" or "coupled" with each other. The coupling or connection between the elements may be physical, logical, or a combination thereof. For example, "connection" may be read as "access". As used in the present disclosure, the two elements may be thought of as being "connected" or "coupled" to each other using at least one of the one or more wires, cables, and printed electrical connections and, as a number of non-limiting and non-inclusive examples, electromagnetic energy having wavelengths in the radio frequency region, the microwave region, and the light (both visible and invisible) region.

The reference signal may be abbreviated as RS or may be referred to as a pilot, depending on the applied standards.

The description "based on" used in the present specification does not mean "based on only" unless otherwise specifically noted. In other words, the phrase "base on" means both "based on only" and "based on at least".

Any reference to an element using terms such as "first" or "second" as used in the present disclosure does not generally limit the amount or the order of those elements. These terms may be used in the present disclosure as a convenient way to distinguish between two or more elements. Therefore, references to the first and second elements do not imply that only two elements may be employed or that the first element must in some way precede the second element.

"Means" included in the configuration of each of the above apparatuses may be replaced by "parts," "circuits," "devices," etc.

In the case where the terms "include", "including" and variations thereof are used in the present disclosure, these terms are intended to be comprehensive in the same way as the term "comprising". Further, the term "or" used in the present specification is not intended to be an "exclusive or".

In the present disclosure, in a case where an article is added by translation, for example "a", "an", and "the", the disclosure may include that the noun following these articles is plural.

In this disclosure, the term "A and B are different" may mean "A and B are different from each other." It should be noted that the term "A and B are different" may mean "A and B are different from C." Terms such as "separated" or "combined" may be interpreted in the same way as the above-described "different".

An aspect/embodiment described in the present specification may be used independently, may be used in combination, or may be used by switching according to operations. Further, notification (transmission/reporting) of predetermined information (e.g., notification (transmission/reporting) of "X") is not limited to an explicit notification (transmission/reporting), and may be performed by an implicit notification (transmission/reporting) (e.g., by not performing notification (transmission/reporting) of the predetermined information).

Note that the AMF in the present disclosure is an example of a network node.

As described above, the present invention has been described in detail. It is apparent to a person skilled in the art that the present invention is not limited to one or more embodiments of the present invention described in the present specification. Modifications, alternatives, replacements, etc., of the present invention may be possible without departing from the subject matter and the scope of the present invention defined by the descriptions of claims. Therefore, the descriptions of the present specification are for illustrative purposes only, and are not intended to be limitations to the present invention.

DESCRIPTION OF THE REFERENCE NUMERALS

10 Base station
110 Transmission unit
120 Reception unit
130 Configuration unit
140 Control unit
20 Terminal
210 Transmission unit
220 Reception unit
230 Configuration unit
240 Control unit
30 Network node
1001 Processor
1002 Storage device
1003 Auxiliary storage device
1004 Communication device
1005 Input device
1006 Output device

The invention claimed is:
1. A network node comprising:
a transmitter configured to register information of a terminal to a User Data Repository (UDR);
a receiver configured to receive, from the UDR, a response to registration of the information of the terminal, and
a processor configured to associate the response to the registration of the information of the terminal with a first point in time at which the information of the terminal is registered to the UDR and to store the response and the associated first point in time, wherein the receiver is configured to receive an error notification of the UDR that includes a second point in time at which mirroring with a backup is performed by the UDR and a third point in time, the third point in time being after an occurrence of the error, at which the UDR is recovered to a state resulting from performing mirroring based on the backup, the error notification indicating potential data inconsistency in the UDR, and wherein the processor is configured to determine that a re-registration operation of the terminal is required in response to the first point in time being equal to or later than the second point in time and being equal to or earlier than the third point in time.

2. A communication method executed by a network node, the method comprising: registering information of a terminal to a User Data Repository (UDR); receiving, from the UDR, a response to registration of the information of the terminal; and associating the response to the registration of the information of the terminal with a first point in time at which the information of the terminal is registered to the UDR, and storing the response and the associated first point in time, wherein the network node receives an error notification of the UDR that includes a second point in time at which mirroring with a backup is performed by the UDR and a third point in time, the third point in time being after an occurrence of the error, at which the UDR is recovered to a state resulting from performing mirroring based on the backup, the error notification indicating potential data inconsistency in the UDR, and wherein the network node determines that a re-registration operation of the terminal is required in response to detecting that the first point in time is equal to or later than the second point in time and that the first point in time is equal to or earlier than the third point in time.

* * * * *